J. & J. E. SCHUMACHER.
APPARTUS FOR MAKING PLASTER BOARD.
APPLICATION FILED NOV. 2, 1916.
1,262,271.
Patented Apr. 9, 1918.
2 SHEETS—SHEET 1.
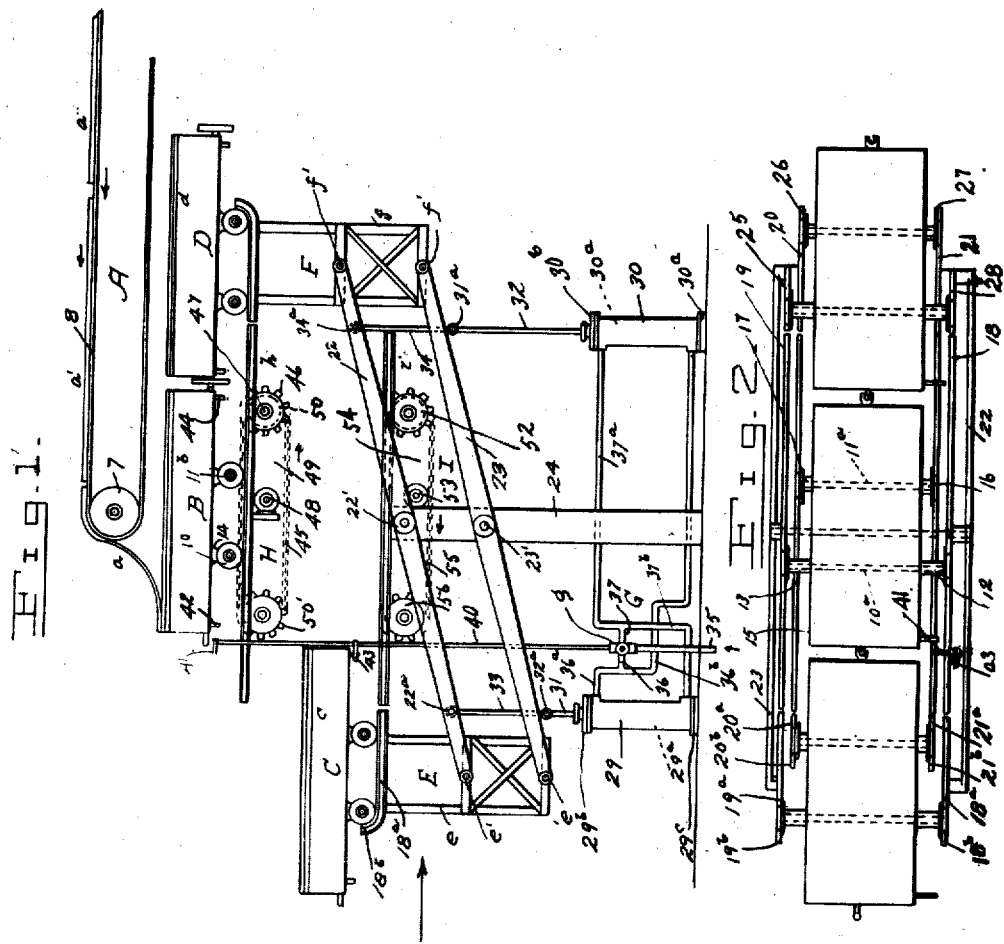

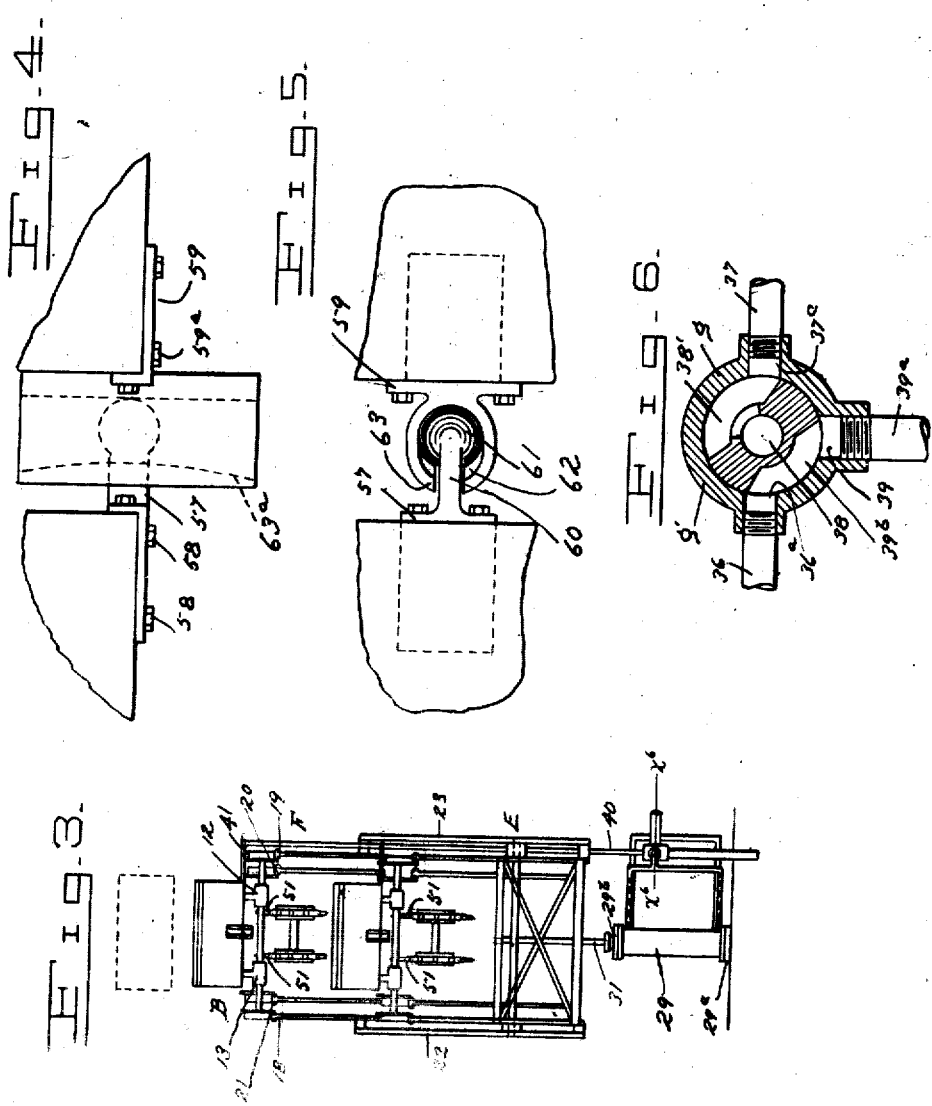

UNITED STATES PATENT OFFICE.

JOHN SCHUMACHER AND JOSEPH E. SCHUMACHER, OF LOS ANGELES, CALIFORNIA.

APPARATUS FOR MAKING PLASTER-BOARD.

1,262,271.   Specification of Letters Patent.   Patented Apr. 9, 1918.

Application filed November 2, 1916. Serial No. 129,160.

*To all whom it may concern:*

Be it known that we, JOHN SCHUMACHER and JOSEPH E. SCHUMACHER, both citizens of the United States, residing at Los Angeles, in the county of Los Angeles and State of California, have jointly invented new and useful Improvements in Apparatus for Making Plaster-Board, of which the following is a specification.

This invention relates to apparatus for making plaster board and the like, and more particularly to apparatus for carrying on certain steps in the manufacture of plaster board, or for facilitating the handling of the plaster board as it is being manufactured, and the invention has for its object to provide an improved apparatus whereby plaster board lengths as delivered by a conveyer or other plaster board apparatus may be stacked, each length in superficial contact with other lengths, and the invention is therefore adapted for carrying on certain steps of the process of making plaster board disclosed in Letters Patent of the United States granted to us March 21, 1916, No. 1,176,322 for process of making plaster board, and Letters Patent of the United States granted to us March 28, 1916, No. 1,176,860, for process of making plaster board and the like.

In accordance with the invention, a plurality of carriers for trays adapted to receive plaster board lengths or units are provided, such carriers being so mounted for movement in a continuous path that they may be successively presented to the zone of discharge of such plaster board units from other apparatus, such as a conveyer belt, and the trays are presented to the plaster board units to receive the same in such manner that a unit of a given length will exactly overlie the bed of the tray presented, or a previously applied unit thereon; and in the movement of such carriers with the trays carried thereby, the rate of movement through the unit receiving zone may be the same rate of movement as the units have due to conveyer movement; a plurality of carriers, upon each of which is mounted a tray adapted to be loaded with plaster board units in stacked relation and each in superficial contact with another, or others, may be propelled through a pre-determined circuit or path and each in turn as presented receive a plaster board unit from the conveyer or the like, and the apparatus is preferably so arranged that the trays are moved under the discharge end of the conveyer as they receive plaster board units and are moved in the direction of plaster board discharge so that each succeeding unit may automatically be applied to the top of the stack and evenly overlie a previously applied unit, each carrier or car and the tray carried thereby being successively moved away from the point of discharge and returned thereto in its proper sequence to receive a further plaster board unit and closely follow an intervening car. After a car or a plurality of cars or a tray or trays thereon have been loaded with stacked plaster board units to the desired height, such loaded tray or trays may be removed and replaced by another tray or other trays to be loaded. In the manufacture of plaster board heretofore, it has been necessary in the stacking process, in order to cause the sheets or units of plaster board to overlie each other in superficial contact, to place the last applied sheet on the top of the stack, as by dragging the same over the stack, as from end to end thereof, and such dragging or sliding of the sheets, should the paper surfaces thereof be moist, results in tearing, cracking and rolling of the paper surfaces and the damaging of the plaster board sheet or unit; however, this tearing or rolling up of the paper surface does not occur with the plaster board units formed with paper treated to retard permeation by moisture, as disclosed in our above mentioned Letters Patent; however, with apparatus organized in accordance with the present invention; it is possible to cause successively applied sheets or units of plaster board to overlie each another, even if such sheets are formed with paper surfaces other than the paper treated to retard permeation by moisture, that is even if the paper sheets forming the surfaces of the plaster board are moist; this is due to the fact that as a tray is advanced under the point of discharge of the conveyer the leading edge or end of a plaster board unit being fed or delivered by the conveyer will be applied to the leading edge of a previously applied unit or, in the case of the first unit, applied at the leading edge of the tray, and, due to the uniform rate of motion of the conveyer and the tray, for the tray is advanced with the leading edge of the plaster board applied thereto and the following portions thereof will be successively fed to the tray in the advance thereof, so as to cause each successively applied portion of the plaster board to be smoothly and evenly applied to the tray and when the last or following edge or end of the plaster board unit is reached it will then be approximately in registration with the last edge or end of the other sheets or units of the stack. After a unit has been so applied to the tray another tray will present itself at the leading edge of another plaster board unit leaving the plaster board discharge point and receiving the leading edge of the next plaster board unit fed by the conveyer, such feeding process being practically continuous, and such next sheet will be, in the manner just described, applied to its receiving tray, or the stack of units thereon. As the first mentioned tray is moved away from the plaster board receiving zone, it is, in the form of the invention shown in the drawings, lowered out of the path of the tray and carrier then in unit receiving position, and is returned beneath the same to be later again moved past the point of plaster board discharge to receive another unit. Three such carriers with trays thereon are illustrated, so that while one tray is receiving a plaster board unit or sheet, another tray will be taking up its position behind such receiving tray to be in readiness to receive the next sheet, while the third tray having just received a sheet of plaster board is being moved out of the way of the first tray and is being returned to plaster board unit receiving position to immediately take up its position after the tray just ahead of the same has received its plaster board unit. The carriers for the trays may run on a level track through the plaster board receiving zone, and end portions or sections of such track may be arranged, one on an elevator and the other on a lowering device to permit the lowering and raising of the sections, the section forward of the plaster board receiving car being lowered to transfer the car to a track located in a lower plane whereupon such car is returned to a point beneath the point of discharge of the conveyer, the section or track at the other end and beneath such conveyer being in lowered position to receive such car at the time of arrival at such point and to transfer the same on an elevator on which said track section is mounted to the plane of the upper track, the rails being brought into registration so that such transferred car may be in readiness to follow the then plaster board receiving car. Propelling means are provided for the plaster board receiving car which will have automatically connected therewith the car returned by the elevator to the plaster board receiving plane and such receiving car will be automatically uncoupled from the following car after it has received its plaster board unit and is automatically lowered on its lowering device. The lowering device and the elevator are shown as joined or mounted upon a common support, and in such a manner that when the lowering device is moving downwardly the elevator is moving upwardly, and vice versa. Propelling means for the cars being transferred from the lowering device to the elevator in the plane of the lower track are provided. Power may be applied to the elevating and lowering devices to cause the actuation of the same, and the application of such power may be controlled automatically by car or carrier movement; such power device is shown as a pair of hydraulic cylinders adapted to actuate the connected lowering device and the elevator, and the control of pressure medium to such cylinders may be through a suitable control valve actuated in the movement of the car receiving plaster board at any given time. Such control automatically times the lowering of a car after receiving its plaster board unit and the returning of the car to position to enter the plaster board receiving zone.

A further object of the invention is to provide an apparatus of the general character stated which will be relatively simple and inexpensive in construction when its advantages in economy of labor, rapid production, and general efficiency are considered, and which will be dependable, long of life, and which will be generally superior in serviceability.

With the above and other objects in view, the invention consists in the novel and useful provision, formation, combination, relative arrangement and mode of operation of parts, members and features, all as hereinafter described, shown in the drawings, and finally pointed out in claims.

In the drawings:

Figure 1 is a side elevation of apparatus constructed and organized in accordance with the invention, a belt conveyer being shown as delivering plaster board units to the apparatus;

Fig. 2 is a plan view of the apparatus, the belt conveyer shown in Fig. 1 being omitted;

Fig. 3 is an end elevation of the showing in Figs. 1 and 2 and looking in the direction of the large arrow near Fig. 1;

Fig. 4 is an enlarged side elevation of means for automatically coupling the cars or carriers and permitting the automatic uncoupling of the same at the proper point in the travel of such cars, fragments of cars being shown;

Fig. 5 is a plan view of a showing in Fig. 4; and

Fig. 6 is an enlarged horizontal sectional view taken on the line $x^6$—$x^6$, Fig. 3, and looking in the direction of the appended arrows, showing the construction of a controlling valve whereby the actuation of the lowering device and the elevator is controlled.

Corresponding parts in all the figures are designated by the same reference characters.

Referring with particularity to the drawings, in the embodiment of the invention therein shown, A designates a belt conveyer forming the discharge end of plaster board forming apparatus. B, C and D each designate a car adapted to support a tray, the trays being shown at $b$, $c$ and $d$, respectively, E designates a lowering device. F designates an elevating device. G designates means for operating said lowering device E and said elevating device F. H designates means for propelling the cars through the plaster board receiving zone, and I designates means for propelling the cars from the lowering device to the elevating device; an upper track is shown at $h$ and a lower track is shown at $i$.

The belt conveyer A is conventionally illustrated and the discharge end thereof only is shown, a roller 7 being shown as provided with a belt 8 passed about the same, and such belt 8 may lead from the point of plaster board formation, such plaster board being usually formed by inserting a moist unstable plastic composition between two surface sheets of paper or the like and forming or gaging the same to proper thickness during the manufacture thereof; the plaster board so formed is cut into rough lengths or units shown at $a$, $a'$, and $a''$, respectively. The movement of the conveyer belt is in the direction indicated by the small arrow, Fig. 1.

The construction and organization of the cars B, C and D is the same, wherefore the description of the car B will serve as a description for all such cars. The car B comprises a rectangular framework $d$, a forward pair of wheels 10, and a pair of rear wheels 11, the forward wheels 10 being mounted on an axle $10^a$ and the rear wheels being mounted on an axle $11^a$. The axle $10^a$ is passed through journal bearings 12 and 13 provided on the respective side members 14 and 15 of the rectangular frame $d$, and the axle $11^a$ is mounted in journal bearings 16 and 17 secured to the respective side members 14 and 15. The axle $10^a$ is of greater length than the axle $11^a$ so as to space the forward wheels farther away from the side members 14 and 15 than the wheels 11 are spaced therefrom, this arrangement permitting the use of independent tracks or rails for the forward and rearward set of wheels. The track $h$ is organized as clearly illustrated in Figs. 2 and 3, and comprises a widely separated pair of rails 18 and 19, and a relatively narrow pair of rails 20 and 21, the widely separated rails being adapted for co-action with the wheels 10 of the cars, and the relatively narrow track formed by the rails 20 and 21 being adapted for co-action with the rearward set of wheels 11 of the cars. The track or trackage $i$ is similarly organized and comprises a pair of widely spaced rails and another pair of rails within the pair of widely spaced rails, to the end that the car may properly traverse the track $i$.

The lowering device E preferably consists of a framework $e$ and the elevating device F preferably consists of a similar framework $f$, such frames $e$ and $f$ being pivotally secured to supporting arms 22 and 23 as at $e'$ and $f'$, respectively, such pivotal connection being made at the ends of the arms 22 and 23 which arms are provided in duplicate, one at each side of the lowering and elevating devices, such arms 22 and 23 being pivoted to a central support 24 as at $22'$ and $23'$, respectively. The pair of arms 23 is disposed beneath the pair of arms 22, as clearly illustrated in Fig. 1, so that the upper portion of the frames $e$ and $f$ will always be maintained in horizontal position regardless of the plane in which the same may at any time be disposed. The tracks are provided on the frame $e$ and such tracks comprise a plurality of rails $18^a$ and $19^a$ spaced to register with the rails 18 and 19 when the frame is in its uppermost position, and a plurality of rails $20^a$ and $21^a$ spaced to register with the rails 20 and 21 when the frame is in its uppermost position. The rails $18^a$, $19^a$, $20^a$, and $21^a$ all have upturned outer ends as at $18^b$, $19^b$, $20^b$, and $21^b$, respectively, to arrest the car in its travel over such rails. The frame $f$ is provided with a similar arrangement of rails having upturned ends, such rails being shown at 25, 26, 27 and 28, and such rails are arranged to provide a plurality of tracks or ways for registration with the trackage $h$ when the frame F is in its uppermost position. The rails on the frames $e$ and $f$ likewise register with the trackage $i$ when the respective frames are in their lowermost positions. The operating means G may comprise a plurality of hydraulic cylinders 29 and 30 provided with pistons $29^a$ and $30^a$ respectively, such pistons being connected through upper cylinder heads $29^b$ and $30^b$ provided on the respective cylinders 29 and 30, by means of piston rods 31 and 32, respectively, with an arm 22, an intermediate link or connecting rod 33 being provided for pivotal connection with one of the arms 22 near the framework $e$ as at $22^a$ and a further link 34 being provided for pivotal connection of the piston rod 32 with the arm 22 near the frame $f$ as at $34^a$. The ends of the links 33 and 34 are connected with the piston rods 31 and 32 as at $31^a$ and $32^a$, respectively. The cylinders 29 and 30 are closed at their lower ends as at $29^c$ and $30^c$, respectively. The cylinders 29 and 30 are connected with a source of pressure medium supply, such as a water main or the like, by means of a supply pipe 35 which leads to a valve $g$ of the power control means. The cylinders are connected with the casing $g'$ of the valve $g$ by means of a branched pipe 36, one branch $36^a$ of said pipe leading to the top of the cylinder 29 and another branch $36^b$ of such pipe leading to the bottom of the cylinder 30, the cylinders being further connected through another branched pipe 37, one branch $37^a$ of which leads to the top of the cylinder 30 and the other branch $37^b$ of which leads to the bottom of the cylinder 29. The valve proper or key $g''$ is rotatably mounted in its casing $g'$ and such casing $g'$ is provided with a port $36^c$ at the point of communication of the pipe 36 with the interior of the valve casing, and such casing is provided with a port $37^c$ at the point of communication of the pipe 37 with the valve casing $g'$. The pipe 35 connects with the bottom of the casing $g'$ and may communicate with a central bore 38 provided in the valve or key $g''$ and with a distributing duct $38'$ forming a lateral extension of the duct formed by the bore 38 and adapted to be brought into registration with either the port $36^c$ or the port $37^c$. A further port 39 is provided for connection with a discharge pipe $39^a$, and the valve or key $g''$ is cut away as at $39^b$ to provide a duct which may be brought into registration with the port 39 and either of the ports 36 or 37 according to the positioning of the valve. The valve or key $g'$ is provided with a vertically ranging operating stem 40 whereby the valve may be oscillated upon oscillation of the stem and such oscillation of the stem is provided for by a tooth provided thereon at 41 in the path of the unit receiving car which is provided with a lug 42 adapted to co-act with such tooth 41, and a tooth 43 provided at an angle to the tooth 41 on the stem 40 and disposed in the path of a further lug 44 provided at the opposite end of the car, it being understood that each car is so provided with lugs 42 and 44. The cars in the traverse of the trackage bring the lugs 41 and 44 into contact with either the arm or tooth 41 or 43 and such tooth being located at the proper point in the travel of the car, the connection with the proper ends of the cylinders will be made to cause the elevation of the frame $f$ and the lowering of the frame $e$ when a car is on the frame $f$ to return the same from the lower plane to the plane of the zone of loading of such cars or the trays thereon. After a car has been returned to the working zone and has been connected with the car on the trackage $h$, as will presently be described, and such car has been moved forwardly and off of the trackage on the frame $f$ the connection to the cylinders will have been reversed by moving the valve and the lower portion of the cylinder 29 connected with pressure medium supply through the branch pipe $37^b$ while the upper end of the piston 30 will be connected through the pipe $37^a$ and the upper portion of the cylinder 29 and the lower portion of the cylinder 30 will be connected with the discharge pipe $39^a$ through the duct $39^b$ in the valve. This will permit the exhaust of working fluid above the piston $29^a$ and below the piston $30^a$ while pressure is being applied above the piston $30^a$ and below the piston $29^a$ to return the frame $e$ and the trackage thereon to the working zone in readiness to receive a loaded car. After a loaded car has been moved thereon the proper lug will have engaged a tooth on the stem 40 and again reverse the connections to the cylinders whereupon the platform $e$ will be drawn downwardly with the loaded car thereon while the frame $f$ is moved upwardly. The trackage consisting of a plurality of sets of rails differently spaced, permits lowering and raising of the cars after very little travel on the frames $e$ or $f$ as the axles 11 provided rearwardly of the cars may readily pass between the widely separated rails 18 and 19.

The operating or propelling means H may comprise a chain 45 rove about a sprocket 46 fixed to a shaft 47 suitably journaled in the framework and driven by means of an electric motor or the like 48 through a belt 49 rove about the motor pulley and a pulley 50 on the shaft 47. The chain is likewise rove about an idler sprocket 50 provided between the rails of the trackage $h$. A tooth 51 provided at the forward end of each car is adapted to take into the chain 45 to propel the car. A further tooth 51 is provided at the opposite end of the car to take into the operating or propelling means I to propel the car from the trackage on the frame $e$ to the trackage on the frame $f$ which frame $f$ is in its uppermost position while a car is being transferred from the frame $e$ in its lowermost position, to the trackage $i$ beneath which the operating means I is located. After the car has been moved sufficiently far on to the trackage $i$ the tooth 43 will have been actuated thereby and the connections to the hydraulic cylinders reversed by returning the frame $e$, which is bifurcated so as to lie at both sides of the car, to its uppermost position with a consequent return to the frame $f$ to the lowermost position and in readiness to receive a car to be returned to the upper or working zone thereof. The operating means I comprises a sprocket 52, a motor 53 for operating said sprocket through a pulley and belt device 54, a chain 55, and an idler sprocket 56, the sprockets being spaced one near each end of the trackage $i$, and the chain rove around the sprockets. Suitable journal bearings for the shafts 52ᵃ and 56ᵃ of the respective sprockets 52 and 56 are provided.

The means for automatically coupling and uncoupling the cars is illustrated on an enlarged scale in Figs. 4 and 5. Such means may comprise a member 57 bolted to the rear end of one of the cars as at 58 and a member 59 bolted to the forward end of another car as at 59ᵃ. The member 57 is provided with a relatively narrow neck 60 springing rearwardly therefrom and such neck carries a head 61 which is preferably spherical. The member 59 is preferably bifurcated or vertically slotted as at 62, the leading edges at the side of the slot being inturned as at 63 so as to accommodate the neck 60 and retain the head 61 which enters the slot from the upper end as a car is raised by the frame f into a load receiving car, and such leading edges 63 may be arranged to taper as indicated at 63ᵃ so that the slotted member may be readily pushed over the head 61, and such head have a snug fit in the slotted portion of the member 59 when the cars are on the same plane and the unit receiving car is to tow or draw along the car just transferred to its level. When the unit receiving car has received its unit of plaster board and the car being towed is itself being drawn by the chain 45 instead of the coupling means, and at the point in the operation of the device when the car which has received its unit of plaster board is to be lowered, the hydraulic cylinder connections will be actuated to lower the forward car and the same will be automatically uncoupled by drawing the head 61 through the lower portion of the slot in the member 59 and out on the lower end of such member, thus freeing the cars.

The plaster board unit receiving trays b, c, and d on which the plaster board is permitted to harden or set may be organized as are the trays disclosed in said Letters Patent, and such trays may be placed one upon each of the cars B, C, and D, and extra trays are preferably on hand so that when such trays b, c and d are loaded to their capacity they may be replaced by other trays fitted upon the cars.

The operation, method of use and advantages of the invention will be readily understood from the foregoing description, taken in connection with the accompanying drawings and the following statement:

The operating means H, the operating means I, and the conveyer A being driven each at its proper rate of speed, a car being passed under the conveyer discharge end, where the plaster board unit a is shown as being discharged by the conveyer, will receive said unit, as hereinbefore explained, and the car will be propelled by the chain, towing a further car, and the car being towed or the tray thereon will receive the next plaster board unit a while the car B with its tray and the plaster board unit a is being lowered by the lowering means E, the car having actuated with the valve of the means G as hereinbefore explained to lower the means E. As a car is being lowered, the receiving car is still advancing and upon the lowering of the loaded car to the level of the trackage i, its tooth 51 will be engaged with the chain 55 of the operating means I and the car will be rapidly moved over the trackage i onto the elevating means F. As soon as the car has moved far enough on the trackage i a lug on the side of the car will have actuated the tooth 43 to reverse the hydraulic connections and the lowering means E will immediately rise to meet the then unit receiving car and the car on the lower trackage i will be rapidly propelled by the chain 56 through its tooth 51 onto the trackage of the frame-work f of the elevating means F which position will be reached as another car which has just received its plaster board unit is completely supported on the lowering means and such car has through a lug thereon again actuated the controlling means of the means G to reverse the hydraulic connections, whereupon the lowering means will descend and the elevating means will rise and the just elevated car will be coupled onto the car then in engagement with the chain 45 and in unit receiving position while the car on the lowering means will be rapidly propelled over the trackage i and in its turn be elevated, the hydraulic connections being reversed by such car in its traverse of the trackage i and the elevating means being in position to receive the car while the lowering means is in position to receive the then loading car as soon as its strip of plaster board shall have been placed thereon or on the tray thereof.

Having thus disclosed my invention, I claim and desire to secure by Letters Patent:

1. In output discharge means, an output delivery member, a plurality of output receiving members to which output in individual units is successively delivered therefrom, and means for successively presenting said out-put receiving members in position for reception of output in sequence and in positive timed relation to the delivered output; said last named means comprising mechanism for so moving the output receiving members, and mechanism for operatively disconnecting said output receiving members from said first named mechanism and subsequently operatively connecting the same therewith.

2. In output discharge means, an output delivery member, a plurality of output receiving members to which output is successively delivered therefrom, and means for successively presenting said output receiving members in position for reception of output in sequence and in positive timed relation to the delivered output; said last named means comprising mechanism for so moving the output receiving members, and mechanism for operatively disconnecting said output receiving members from said first named mechanism and subsequently operatively connecting the same therewith; means being provided for inter-engaging certain of said output receiving members for joint movement in timed relation with the output delivered.

3. In output discharge means, an output delivery member, a plurality of output receiving members to which output is successively delivered therefrom, and means for successively presenting said output receiving members in position for reception of output in sequence and in positive timed relation to the delivered output; said last named means comprising mechanism for so moving the output receiving members, and mechanism for operatively disconnecting said output receiving members from said first named mechanism and subsequently operatively connecting the same therewith; means being provided for inter-engaging certain of said output receiving members for joint movement in timed relation with the output delivered; said last named mechanism being controlled by said output receiving members.

4. In output discharge means, an output delivery member, a plurality of output receiving members to which output is successively delivered therefrom, and means for successively presenting said output receiving members in position for reception of output in sequence and in positive timed relation to the delivered output; said last named means comprising mechanism for so moving the output receiving members, and mechanism for operatively disconnecting said output receiving members from said first named mechanism and subsequently operatively connecting the same therewith; said output receiving members being actuated by said mechanisms in repeated cycles including reversely extending paths, means being provided to that end.

5. In output discharge means, an output delivery member, a plurality of output receiving members to which output is successively delivered therefrom, and means for successively presenting said output receiving members in position for reception of output in sequence and in positive timed relation to the delivered output; said last named means comprising mechanism for so moving the output receiving members, and mechanism for operatively disconnecting said output receiving members from said first named mechanism and subsequently operatively connecting the same therewith; said last named mechanism comprising separate elevator devices, and means for oppositely moving the same.

6. In output discharge means, an output delivery member, a plurality of output receiving members to which output is successively delivered therefrom, and means for successively presenting said output receiving members in position for reception of output in sequence and in positive timed relation to the delivered output; said last named means comprising mechanism for so moving the output receiving members, and mechanism for operatively disconnecting said output receiving members from said first named mechanism and subsequently operatively connecting the same therewith; said last named mechanism comprising separate elevator devices, and means for oppositely moving the same; said elevator devices being mounted upon a common oscillating support.

In testimony whereof, we have signed our names to this specification in the presence of two subscribing witnesses.

JOHN SCHUMACHER.
JOSEPH E. SCHUMACHER.

Witnesses:
FRANCIS L. ISGRIGG,
RAYMOND IVES BLAKELEE.